United States Patent
Micic et al.

(10) Patent No.: US 11,204,866 B2
(45) Date of Patent: *Dec. 21, 2021

(54) DEEP OBJECT GRAPH TRAVERSAL

(71) Applicant: INTERNATIONAL BUSINESS MACHINES CORPORATION, Armonk, NY (US)

(72) Inventors: Aleksandar Micic, Ottawa (CA); Salman Zia Rana, Ottawa (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/133,205

(22) Filed: Dec. 23, 2020

(65) Prior Publication Data

US 2021/0303462 A1 Sep. 30, 2021

Related U.S. Application Data

(63) Continuation of application No. 16/836,321, filed on Mar. 31, 2020.

(51) Int. Cl.
*G06F 12/02* (2006.01)
*G06F 12/0802* (2016.01)

(52) U.S. Cl.
CPC ...... *G06F 12/0253* (2013.01); *G06F 12/0802* (2013.01); *G06F 2212/251* (2013.01); *G06F 2212/466* (2013.01)

(58) Field of Classification Search
CPC ............ G06F 12/0253; G06F 12/0802; G06F 2212/251; G06F 2212/466
See application file for complete search history.

(56) References Cited

U.S. PATENT DOCUMENTS 6,480,862 B1 * 11/2002 Gall ...................... G06F 12/023
6,826,583 B1    11/2004 Flood et al.
6,993,540 B2     1/2006 Hudson et al.
(Continued)

OTHER PUBLICATIONS

Auhagen et al. "Garbage Collection for Multicore NUMA Machines," Jun. 2011, MSPC '11: Proceedings of the 2011 ACM SIGPLAN Workshop on Memory Systems Performance and Correctness, pp. 51-57. (Year: 2011).*

(Continued)

*Primary Examiner* — Michael Krofcheck
(74) *Attorney, Agent, or Firm* — Cuenot, Forsythe & Kim, LLC

(57) ABSTRACT

A first thread of a garbage collector can determine fields, in class metadata assigned to objects contained in a local memory, that are self-referencing fields. For a plurality of the objects, recursively, the first thread can determine whether the object has at least one child object, indicated by a self-referencing field of the object, that has not been assigned to a destination cache or a previously generated source cache. If so, the first thread can assign the child object to the destination cache to indicate that the child object is live. The first thread can add the destination cache to a global scan queue as a source cache. A second thread of the garbage collector can initiate object scanning on objects indicated in the first source cache. Memory locations where live objects are not located can be reclaimed.

7 Claims, 5 Drawing Sheets

(56) References Cited

U.S. PATENT DOCUMENTS

| | | | |
|---|---|---|---|
| 7,900,011 B2 | 3/2011 | Amundsen et al. | |
| 8,024,379 B2 | 9/2011 | Siegwart et al. | |
| 9,430,376 B2 | 8/2016 | Horn | |
| 2008/0235307 A1* | 9/2008 | Siegwart | G06F 12/0253 |
| 2011/0296132 A1* | 12/2011 | Li | G06F 12/0253 |
| | | | 711/166 |
| 2012/0239711 A1* | 9/2012 | Burka | G06F 12/0253 |
| | | | 707/816 |
| 2019/0361805 A1* | 11/2019 | Horie | G06F 9/45533 |
| 2021/0303461 A1 | 9/2021 | Micic et al. | |

OTHER PUBLICATIONS

Eran, H. et al., "A Study of Data Structures with a Deep Heap Shape," In Proceedings of the ACM SIGPLAN Workshop on Memory Systems Performance and Correctness, Jun. 16, 2013, 8 pgs.

Cohen, N. et al., "Data Structure Aware Garbage Collector," In ACM SIGPLAN Notices, Jun. 14, 2015, vol. 50, No. 11, pp. 28-40.

"Cheney's Algorithm," [online] Wikipedia, Nov. 29, 2019, [retrieved Mar. 31, 2020], retrieved from the Internet: <https://en.wikipedia.org/wiki/Cheney's_algorithm>, 3 pg.

IBM: List of IBM Patents or Patent Applications Treated as Related, 2 pg.

Micic, A. et al., "Deep Object Graph Traversal ", U.S. Appl. No. 16/836,321, filed Mar. 31, 2020, 35 pages.

Augagen et al., "Garbage Collection for Multicore NUMA Machines," Jun. 2011, MSPC '11, Proc. of the 2011 ACM SIGPLAN Workshop on Memory Systems Performance and Correctness, pp. 51-57.

\* cited by examiner

DEEP OBJECT GRAPH TRAVERSAL

The following disclosure(s) are submitted under 35 U.S.C. 102(b)(1)(A):

DISCLOSURE(S): Code implementing the invention was in a public repository, open source project, Eclipse OpenJ9, as early as Jun. 6, 2019. Code implementing the invention was put into official public release in Eclipse OpenJ9 v0.16, released Sep. 17, 2019 as version jdk-13+33_openj9-0.16.0, which supports public project AdoptOpenJDK.

BACKGROUND

The present invention relates to memory management in data processing systems, and more specifically, to garbage collection, which is a form of automatic memory management. Garbage collection is the process of reclaiming memory space occupied by objects that are no longer in use by a computer program. Garbage collection frees computer programmers from having to manually deal with memory deallocation. In consequence, certain categories of bugs are eliminated or substantially reduced. Examples of such bug categories include dangling pointer bugs, double free bugs and memory leaks.

SUMMARY

A method includes, during garbage collection object graph traversal, using a first thread of a garbage collector executed by a processor, determining fields, in class metadata assigned to objects contained in a local memory, that are self-referencing fields. The method also can include, for a plurality of the objects for which the self-referencing fields are determined, recursively: determining, by the first thread of the garbage collector, whether the object has at least one child object, indicated by a self-referencing field of the object, that has not been assigned to a first destination cache or a previously generated source cache; and, responsive to determining that the object has at least one child object, indicated by the self-referencing field, that has not been assigned to the first destination cache or the previously generated source cache, assigning, by the first thread of the garbage collector, the at least one child object to the first destination cache, the assigning the at least one child object to the first destination cache indicating that the at least one child object is a live object. The method also can include adding, by the first thread of the garbage collector, the first destination cache to a global scan queue as a first source cache. The method also can include, using at least a second thread of garbage collector, accessing the first source cache using the global scan queue, and initiating, by the second thread of the garbage collector, object scanning on objects indicated in the first source cache. The method also can include reclaiming, from the local memory, memory locations where live objects are not located.

A system includes a processor programmed to initiate executable operations. The executable operations include, during garbage collection object graph traversal, using a first thread of a garbage collector executed, determining fields, in class metadata assigned to objects contained in a local memory, that are self-referencing fields. The executable operations also can include, for a plurality of the objects for which the self-referencing fields are determined, recursively: determining, by the first thread of the garbage collector, whether the object has at least one child object, indicated by a self-referencing field of the object, that has not been assigned to a first destination cache or a previously generated source cache; and, responsive to determining that the object has at least one child object, indicated by the self-referencing field, that has not been assigned to the first destination cache or the previously generated source cache, assigning, by the first thread of the garbage collector, the at least one child object to the first destination cache, the assigning the at least one child object to the first destination cache indicating that the at least one child object is a live object. The executable operations also can include adding, by the first thread of the garbage collector, the first destination cache to a global scan queue as a first source cache. The executable operations also can include, using at least a second thread of garbage collector, accessing the first source cache using the global scan queue, and initiating, by the second thread of the garbage collector, object scanning on objects indicated in the first source cache. The executable operations also can include reclaiming, from the local memory, memory locations where live objects are not located.

A computer program product includes one or more computer readable storage mediums having program code stored thereon, the program code stored on the one or more computer readable storage mediums collectively executable by a data processing system to initiate operations. The operations include, during garbage collection object graph traversal, using a first thread of a garbage collector executed, determining fields, in class metadata assigned to objects contained in a local memory, that are self-referencing fields. The operations also can include, for a plurality of the objects for which the self-referencing fields are determined, recursively: determining, by the first thread of the garbage collector, whether the object has at least one child object, indicated by a self-referencing field of the object, that has not been assigned to a first destination cache or a previously generated source cache; and, responsive to determining that the object has at least one child object, indicated by the self-referencing field, that has not been assigned to the first destination cache or the previously generated source cache, assigning, by the first thread of the garbage collector, the at least one child object to the first destination cache, the assigning the at least one child object to the first destination cache indicating that the at least one child object is a live object. The operations also can include adding, by the first thread of the garbage collector, the first destination cache to a global scan queue as a first source cache. The operations also can include, using at least a second thread of garbage collector, accessing the first source cache using the global scan queue, and initiating, by the second thread of the garbage collector, object scanning on objects indicated in the first source cache. The operations also can include reclaiming, from the local memory, memory locations where live objects are not located.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
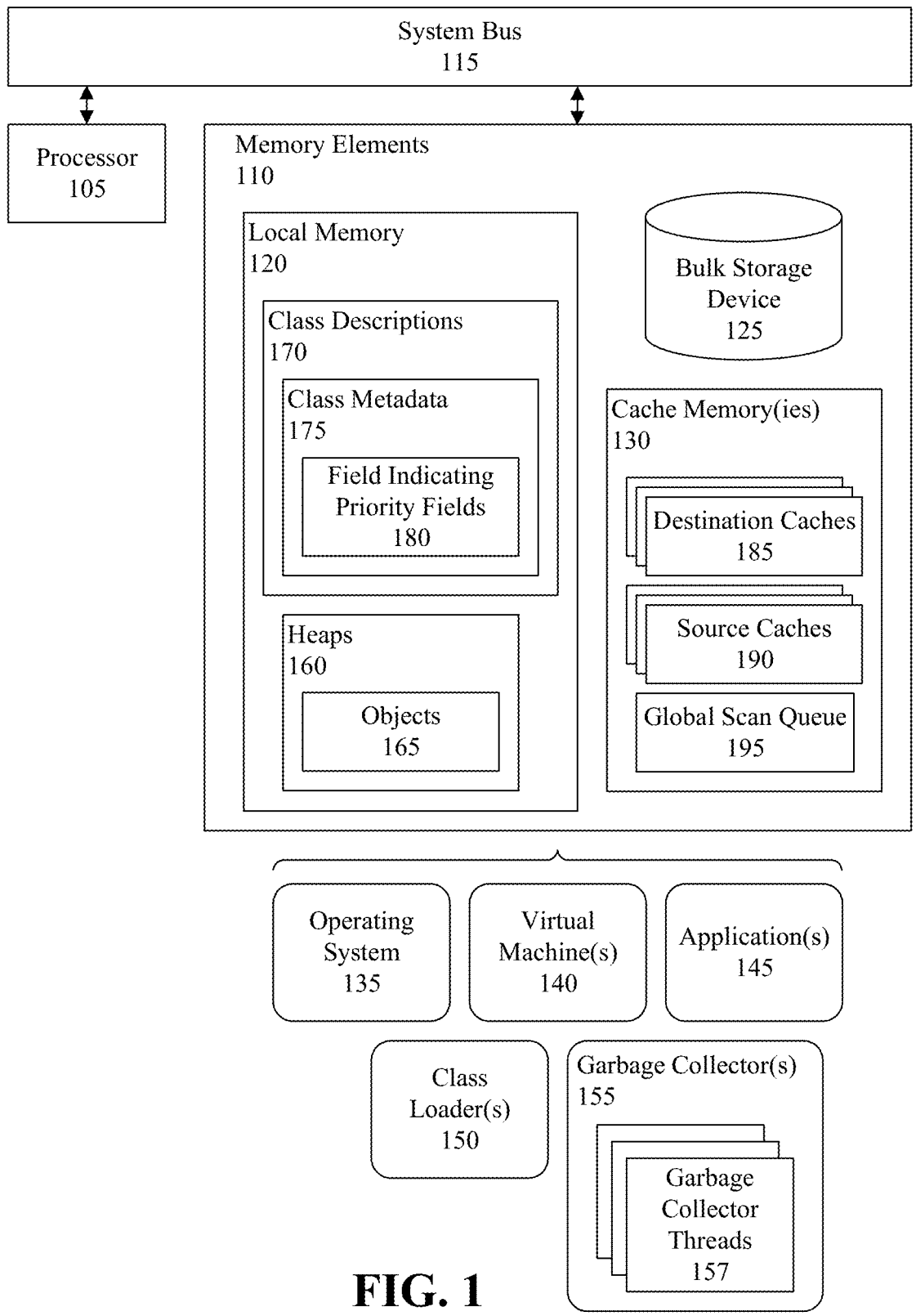
FIG. 1 is a block diagram illustrating an example of a data processing system.

The arrangements described herein are directed to computer technology and, more particularly, to memory management in data processing systems. Specifically, the present arrangements provide a process for performing garbage collection with improved efficiency in comparison to garbage collection techniques previously known in the art. In this regard, the present arrangements solve issues of the prior art relating to parallelizing garbage collection among multiple threads when deep object structures are encountered.

In accordance with the present arrangements, an object is given scan priority if it contains a self-referencing field (e.g., a next pointer or a previous pointer). The self-referencing fields can be identified as priority fields during class loading, and positions of the self-referencing fields in the objects can be determined. During garbage collection scanning, a regular scanning operation can be impeded, for example until after a threshold number of objects having self-referencing fields have been identified, and a special treatment process can be implemented to efficiently balance the object scanning among a plurality of garbage collector threads. The special treatment process can include traversing objects and assigning the objects to destination caches, which can be pushed to a global scan queue as source caches. Various threads of the garbage collector can access the source caches and scan memory slots by occupied by the objects to identify objects that are no longer are live and reclaim those memory locations for other use.

Accordingly, the arrangements described herein discover sharable garbage collection work early in the garbage collection process, and push the shareable work to the global scan queue for processing by various threads of the garbage collector. This serves to increase the performance of garbage collection in comparison to previously known garbage collection techniques. Indeed, initial experimentation implementing the arrangements described herein have shown to reduce the total amount of time to perform garbage collection on a heap of memory by approximately 33%.

Several definitions that apply throughout this document now will be presented.

As defined herein, the term "garbage collection" means a form of automatic memory management that reclaims memory space occupied by objects that are no longer in use by a computer program.

As defined herein, the term "garbage collection live object set traversal" means a process of identifying live objects in a set of objects contained in a heap of local memory by scanning objects in an the set and identifying objects that are connected to other objects (e.g., child objects) by pointers or references.

As defined herein, the term "class" means an extensible program-code-template for creating objects that provides initial values for state (e.g., member variables) and implementations of behavior (e.g., member functions or methods).

As defined herein, the term "object" means a particular instance of a class.

As defined herein, the term "class field" means field of a class.

As defined herein, the term "class metadata" means information about class definitions for a class.

As defined herein, the term "self-referencing field" means a field that references (e.g., points to) an object that is of the same type as the object that contains the field.

As defined herein, the term "priority field" means a field that is identified as being a self-referencing field.

As defined herein, the term "heap" means an area of dynamically-allocated memory that is managed automatically by an operating system, a virtual machine or a memory manager library. Memory on a heap is allocated, deallocated, and resized during computer program execution.

As defined herein, the term "live" means in use by a computer program. Thus, a "live object" is an object that is in use by the computer program. An object that is not live is no longer in use by the computer program, and thus occupies memory space that can be reclaimed for storing other data.

As defined herein, the term "destination cache" means a cache used to temporarily identify live objects until the destination cache becomes full or no other objects remain to be analyzed. Responsive to the destination cache becoming full or no other objects remain to be analyzed, the destination cache can be pushed to a global scan queue as a source cache.

As defined herein, the term "source cache" means a cache used to identify live objects.

As defined herein, the term "global scan queue" means a data structure indicating a plurality of source caches and from which threads of a garbage collector access the source caches to perform garbage collection analysis processes on objects indicated in the source caches.

As defined herein, the term "share threshold" means a threshold size of a cache.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

FIG. 1 is a block diagram illustrating example architecture for a data processing system 100. The data processing system 100 can include at least one processor 105 (e.g., a central processing unit) coupled to memory elements 110 through a system bus 115 or other suitable circuitry. As such, the data processing system 100 can store program code within the memory elements 110. The processor 105 can execute the program code accessed from the memory elements 110 via the system bus 115. It should be appreciated that the data processing system 100 can be implemented in the form of any system including a processor and memory that is capable of performing the functions and/or operations described within this specification. For example, the data processing system 100 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 110 can include one or more physical memory devices such as, for example, local memory 120 and one or more bulk storage devices 125. Local memory 120 refers to random access memory (RAM) or other non-persistent memory device(s) generally used during actual execution of the program code. The bulk storage device(s) 125 can be implemented as a hard disk drive (HDD), solid state drive (SSD), or other persistent data storage device. The data processing system 100 also can include one or more cache memories 130 that provide temporary storage of at least some program code in order to reduce the number of times program code must be retrieved from the local memory 120 and/or bulk storage device 125 during execution.

Input/output (I/O) devices (not shown) such as a display, a pointing device, a keyboard, one or more network adapters, etc., optionally can be coupled to the data processing system 100. The I/O devices can be coupled to the data processing system 100 either directly or through intervening I/O controllers, as is well known in the art.

As pictured in FIG. 1, the memory elements 110 can store software components of the data processing system 100. The software components can include an operating system 135 and, optionally, one or more virtual machines 140. The software components also can include one or more applications 145, one or more class loaders 150, and one or more garbage collectors 155. Being implemented in the form of executable program code, the software components of the data processing system 100 can be executed by the data processing system 100 and, as such, can be considered part of the data processing system 100. Moreover, the operating system 135, virtual machine(s) 140, application(s) 145, class loader(s) 150 and garbage collector(s) 155 implemented by the data processing system 100 are functional data structures that impart functionality when employed as part of the data processing system 100.

One or more of the applications 145 can execute in a software execution environment provided by the operating system 135 and/or one or more of the applications 145 an execute in a software execution environment provided by the virtual machine(s) 140, as is well known in the art. By way of example, the operating system 135 can host a virtual machine 140, and an application 145 can execute via the virtual machine 140.

The class loader(s) 150 can be components of the virtual machine(s) 140. For example, each virtual machine 140 can include a respective class loader 150 configured to dynamically load classes into the virtual machine 140. For example, a virtual machine 140 can initiate a class loader 150 to load classes for an application 145 that uses and/or otherwise requires such classes.

The garbage collector 155 can be a component of the virtual machine 140. In other arrangements, the garbage collector 155 can be a component of the operating system 135 or a component of an application 145. Still, the garbage collector 155 can be a component of another suitable software component of the data processing system 100 and the present arrangements are not limited in this regard.

In operation, the operating system 135 and/or virtual machine(s) 140 can allocate one or more heaps 160 of the local memory 120 for use by the operating system 135, the virtual machine(s) 140 and/or the applications(s) 145. In illustration, a respective heap 160 can be allocated to store objects 165 used by the operating system 135, a heap 160 respective can be allocated to store objects 165 used by a virtual machine 140, and a respective heap 160 can be allocated to store objects used by an application 145. As classes are loaded during software execution, the class loader(s) 150 can build class descriptions 170 of the classes in the local memory 120 (or in the bulk storage device 125), as will be described herein. The class descriptions 170 can include class metadata 175, which can include a field 180 that are identifies class fields that are self-referencing fields. Processing of the self-referencing fields during garbage collection will be described herein.

The garbage collector 155 can automatically perform garbage collection on the local memory 120 to remove from the heaps 160 objects 165 that are no longer in use, as will described herein. During that process, the a thread 157 of the garbage collector 155 can generate traverse objects 165 contained in a heap 160 and generate a plurality destination caches 185 in the cache memory 130 or in a region of the local memory 120 not occupied by the heap 160 on which garbage collection is being performed. Each destination caches 185 can be pushed to a global scan queue 195 and used as source caches 190 for other threads 157 of the garbage collector while performing garbage collection processes. In this regard, each source cache 190 can be a shareable work unit. For example, various threads 157 of the garbage collector 155 each can access a respective source cache 190 as the thread 157 becomes available to scan the source cache 190 during garbage collection. Use of the source caches 190, destination caches 185 and global scan queue 195 during garbage collection will be further described herein.

Figure 2:
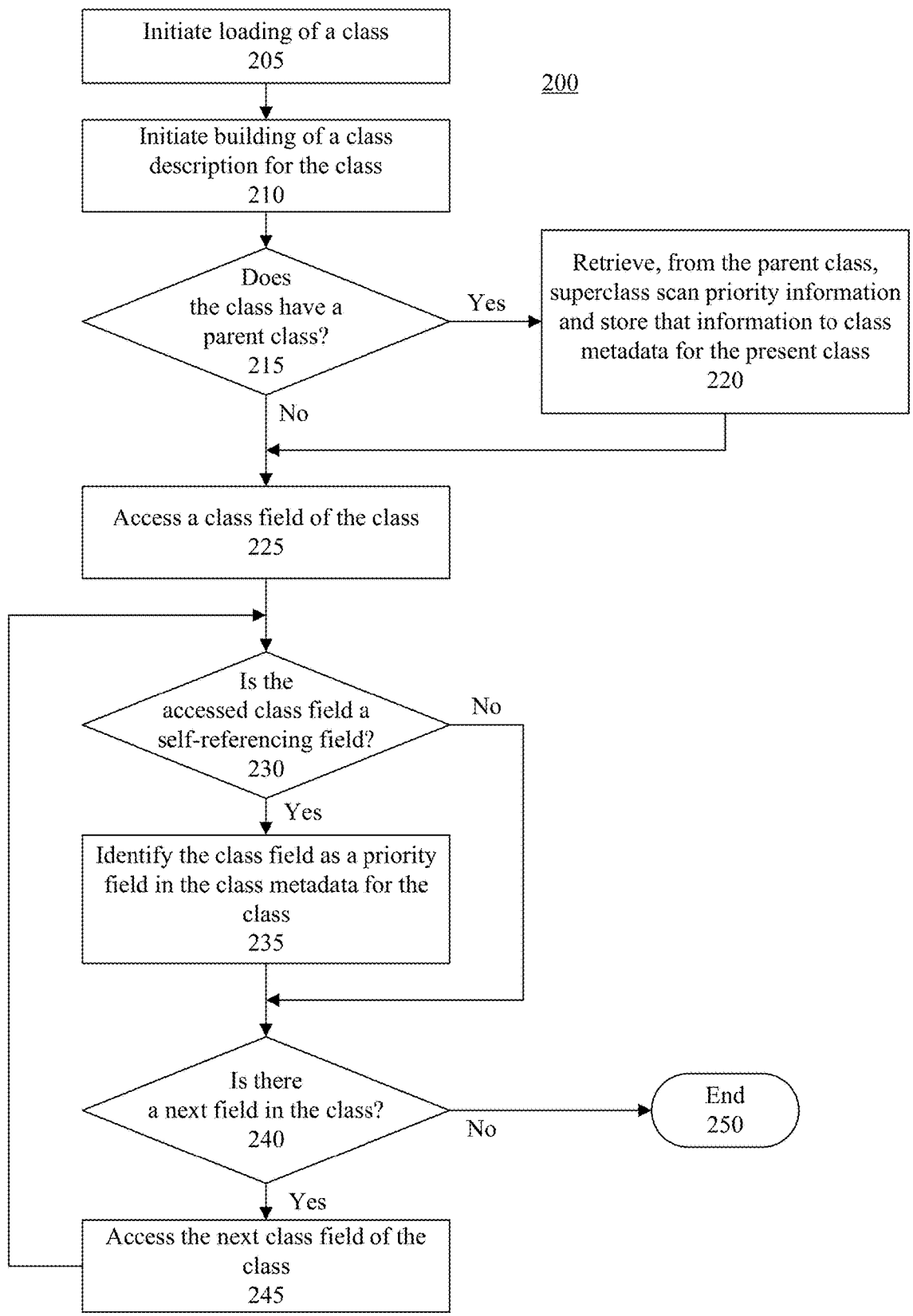
FIG. 2 is a flowchart illustrating an example of a method of identifying at least one class field of a class as a priority field during building of a class description for the class.

FIG. 2 is a flowchart illustrating an example of a method 200 of identifying at least one class field of a class as a self-referencing field during building of a class description for the class. The method 200 can be implemented, for example, by the virtual machine 140 of FIG. 1. In illustration, the method 200 can be implemented by the class loader 150 of the virtual machine 140.

At step 205 the class loader 150 can initiate loading of a class. In illustration, the loading of the class can be initiated at startup of an application 145, or on demand when required by the application 145 using lazy class loading, which is known in the art.

At step 210 the class loader 150 can initiate building of a class description 170 for the class. In addition to other processes for building the class description 170 that are known in the art, the class loader 150 further can implement the following novel process described by elements 215-250 of the method 200.

At decision box 215 the class loader 150 can determine whether the class has a parent class. Responsive to the class loader 150 determining that the class does not have a parent class, the process can proceed to step 225. Responsive to the class loader 150 determining that the class has a parent class, however, at step 220 the class loader 150 can retrieve, from the parent class, superclass scan priority information and store the retrieved superclass scan priority information to class metadata 175 for the present class. The superclass scan priority information can include metadata for the parent class and self-referencing field information for the parent class. At this point it should be noted that the self-referencing field information for the parent class may already exist based on the method 200 having been performed previously for the parent class if the parent class already is loaded.

At step 225 the class loader 150 can access a class field of the class. For example, the class loader 150 can access a first class field of the class. At decision box 230 the class loader 150 can determine whether the accessed class field is a self-referencing field. For example, the class loader 150 can determine whether the field signature in the class field matches the name of the class. If so, the class field is a self-referencing field.

Responsive to the class loader 150 determining that the accessed class field is not a self-referencing field, the process can proceed to decision box 240. Responsive to the class loader 150 determining that the accessed class field is a self-referencing field, however, at step 235 the class loader 150 can indicate, in the class metadata 175, the class field as a priority field for the class contained in the class description 170 for that class. In illustration, the class loader 150 can store, to the class metadata 175, an offset to the self-referencing field for the present class. For example, the offset can be stored in a field 180 of the class metadata 175 configured to indicate priority fields. The offset can serve as an indication of that the class field is a priority field and indicate where the self-referencing field of a class is located given a particular object instance. The offset can be measured from the beginning of the class. The process can proceed to decision box 240.

At decision box 240 the class loader 150 can determine whether there is a next field in the class. Responsive to the class loader 150 determining that there is not a next class field in the class, at step 250 the class loader 150 can end the process of identifying class fields as priority fields. Responsive to the class loader 150 determining that there is a next class field in the class, the process can return to decision box 230 and the process can continue until all of the class fields in the class have been identified, determinations have been made as to which class fields are self-referencing fields, and the self-referencing fields have been identified as priority fields in the class metadata 175.

Figure 3:
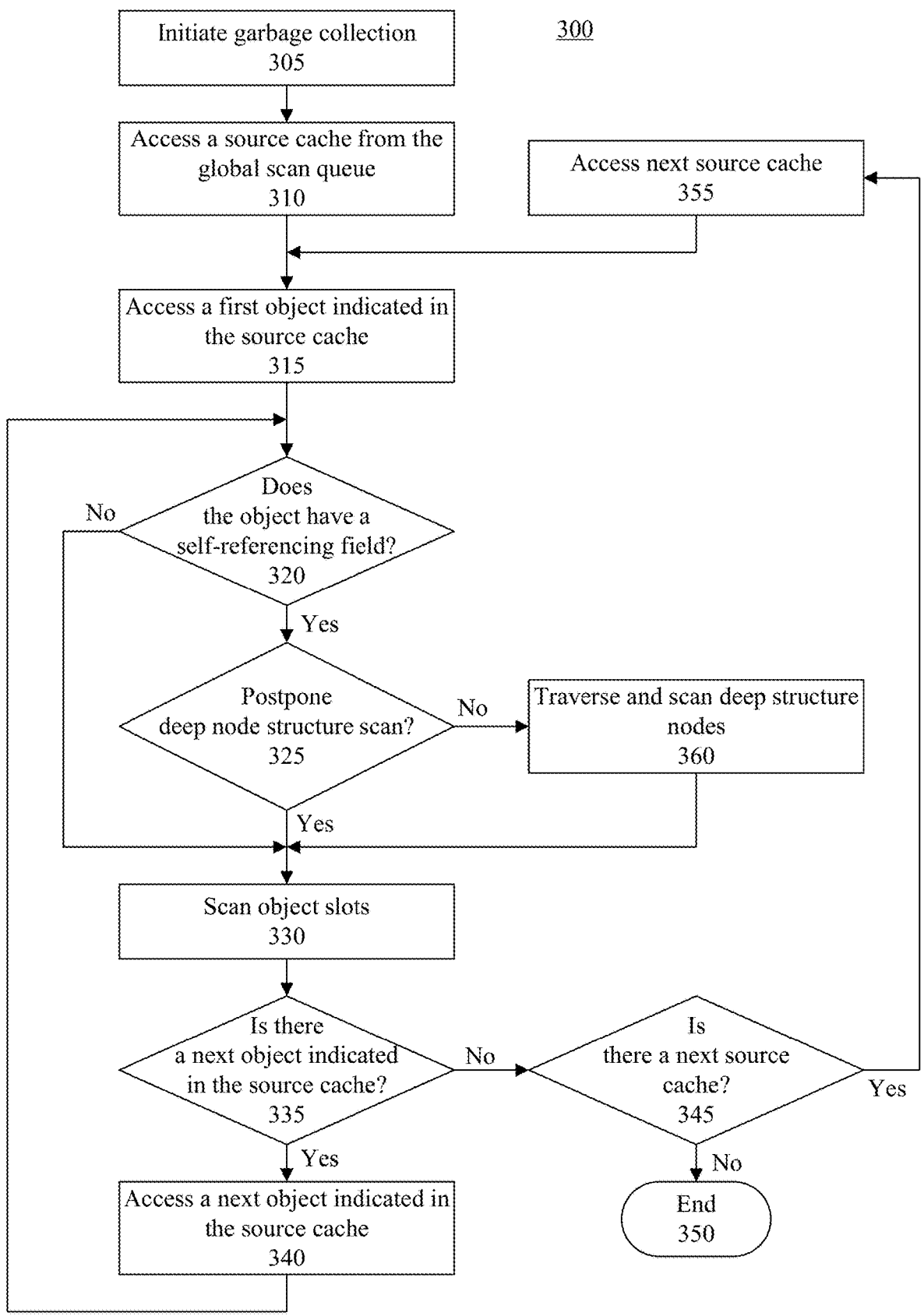
FIG. 3 is a flowchart illustrating an example of a method of performing garbage collection.

FIG. 3 is a flowchart illustrating an example of a method of performing garbage collection. The method 300 can be implemented by the garbage collector 155 of FIG. 1.

At step 305, the garbage collector 155 can initiate garbage collection to reclaim memory space in the local memory 120. Specifically, memory spaced occupied by objects no longer in use by the operating system 135, the virtual machine(s) 140 and/or application(s) 145 can be reclaimed by the garbage collection. The operating system 135, the virtual machine(s) 140 and/or application(s) 145 can automatically trigger the garbage collector 155 to initiate the garbage collection in response to a level of available memory space in a heap in the local memory 120 falling below a threshold value, in response to a level of used memory space in a heap in the local memory 120 exceeding a threshold value, or response to a hook in the operating system 135, the virtual machine 140 and/or application 145 being executed, or in response to any other circumstance specified to trigger the garbage collector 155 to initiate the garbage collection.

Each of a plurality of threads 157 of the garbage collector 155 can perform steps/decision boxes 310-360 of the method 300 until all live objects 165 contained in a heap 160 have been scanned. In illustration, a first thread 157 can process objects identified in a first source cache 190, a second thread 157 can process objects identified in a second source cache 190, and so on. Moreover, when threads 157 encounter deep object structures with parent/child objects, the threads 157 can assign objects to new source caches 190, and other threads 157 can process the objects assigned to those new source caches 190. Although the processes described herein generate new source caches 190 to be processed, prior to garbage collection being initiated at step 305, other source caches 190 will already exist. In illustration, during the initial stages of garbage collection, source caches 190 previously generated during root scanning can be identified by the garbage collector 155 and added to the global scan queue 195. During a root scan, reachable objects 165 are found through thread stacks, etc., and added to source caches 190.

At step 310 a thread 157 of the garbage collector 155 can access a source cache 190 from the global scan queue 195. In this regard, the garbage collector 155 can assign that source cache 190 to that thread 157 for processing. Further, the garbage collector 155 can set a flag for the source cache 190 to indicate that the source cache 190 is assigned to a thread 157. Thus, each source cache 190 need only be assigned to one thread 157. In another arrangement, the garbage collector 155 can remove the source cache 190 from the global scan queue 195, in which case it will not be available to be accessed by other threads to perform the method 300 on that source cache 190.

At step 315 the present thread 157 of the garbage collector 155 can access a first object indicated in the source cache 190. At decision box 320, the present thread 157 can determine whether the accessed object 165 has a self-referencing field, which can be identified as a priority field. Generally speaking, the garbage collector 155 can consider all self-referencing fields to be priority fields. In illustration, the present thread 157 can access the class metadata 175 for the class to which the object 165 belongs and determine whether any class fields of the class are indicated in the field 180 of the class metadata 175 that is configured to indicate priority fields. For example, the present thread 157 can determine whether an offset to the class field is indicated in the field 180.

Responsive to the present thread 157 determining that the class to which the object 165 belongs does not include a self-referencing field (i.e., a priority field), the process can proceed to step 330. Responsive to the present thread 157 determining that the class to which the object 165 belongs does include a self-referencing field, however, at decision box 325 the present thread 157 can determine whether to postpone a deep node structure scan, and thus impede scan of the object 135 until after the deep structure scan has been completed. The purpose of postponing the deep node structure scan is to wait to perform the deep node structure scan until a determination is made as to whether there is a deep enough structure of nodes of objects 165 (e.g., a number of objects 165 exceeding a threshold value) having self-referencing fields that are to be scanned. If there is a deep enough structure of nodes of objects 165, a first plurality of such objects 165 can be assigned to a second thread 157 for garbage collection analysis, a second plurality of such objects 165 can be assigned to a third thread 157 for garbage collection analysis, and so on. If, however, there is not a deep structure of nodes of objects 165 having self-referencing fields, scanning of objects 165 need not be impeded.

The determination of whether to postpone the deep node structure scan be based on a number of objects 165 the garbage collector 155 anticipates will be traversed of deep structure nodes during the garbage collection process. In illustration, the present thread 157 can identify at least three least significant bits of the address of the object 165 in the heap 160 and, based on the least significant bits, determine a probability that the number of objects traversed through the self-referencing field (e.g., number of nodes of the deep structure) will exceed a threshold value. If the probability exceeds a threshold probability value, then the present thread 157 need not postpone the deep structure scan.

Responsive to determining to postpone the deep structure scan, at step 330 the present thread 157 can scan object slots occupied the object 365. An object slot is a location in local memory 120, for example in a heap 160, allocated to an object field (e.g., an initialized class field of the object 165). Further, the garbage collector 155 can reclaim areas of the heap 160 not occupied by live objects. For example, the garbage collector 155 can initiate a copy collector to move the live object 365 to another area of the heap 160, for example a survivor area of the heap 160, and the garbage collector can reclaim memory areas of the heap 160 outside of the survivor area. In another example, the garbage collector 155 can initiate a simple mark-sweep collector to traverse the heap/object graph and mark all found objects 165 as live. The simple mark-sweep collector then can sweep and compact all of the marked objects to an area of the heap 160 (e.g., the survivor area), and reclaim the rest of the heap 160 as available memory. Still, the garbage collector 155 can reclaim areas of the heap 160 not occupied by live objects in any other suitable manner, and the present arrangements are not limited in this regard.

At decision box 335 the present thread 157 can determine whether there is a next object 165 indicated in the source cache 190. If so, at step 340 the present thread 157 can access the next object 165, and the process can return to decision box 320 and continue. For example, the present thread 157 can select the next object 165 from the source cache 190 using a breadth first scan order (BFSO). If there is not a next object 165, however, at step decision box 345 the present thread 157 can determine if there is a next source cache 190 which has not yet been assigned to a thread 157. If not, at step 350 the process can end. If, however, there is a next source cache 190 which has not yet been assigned to a thread, at step 355 the present thread 157 of the garbage collector 155 can access a next source cache 190. The process then can return to step 315 and continue. Accordingly, the present thread 157 can be kept busy processing objects 165 during the garbage collection process, which mitigates the amount of time threads 157 are idle and improves efficiency of the garbage collection process.

Figure 4:
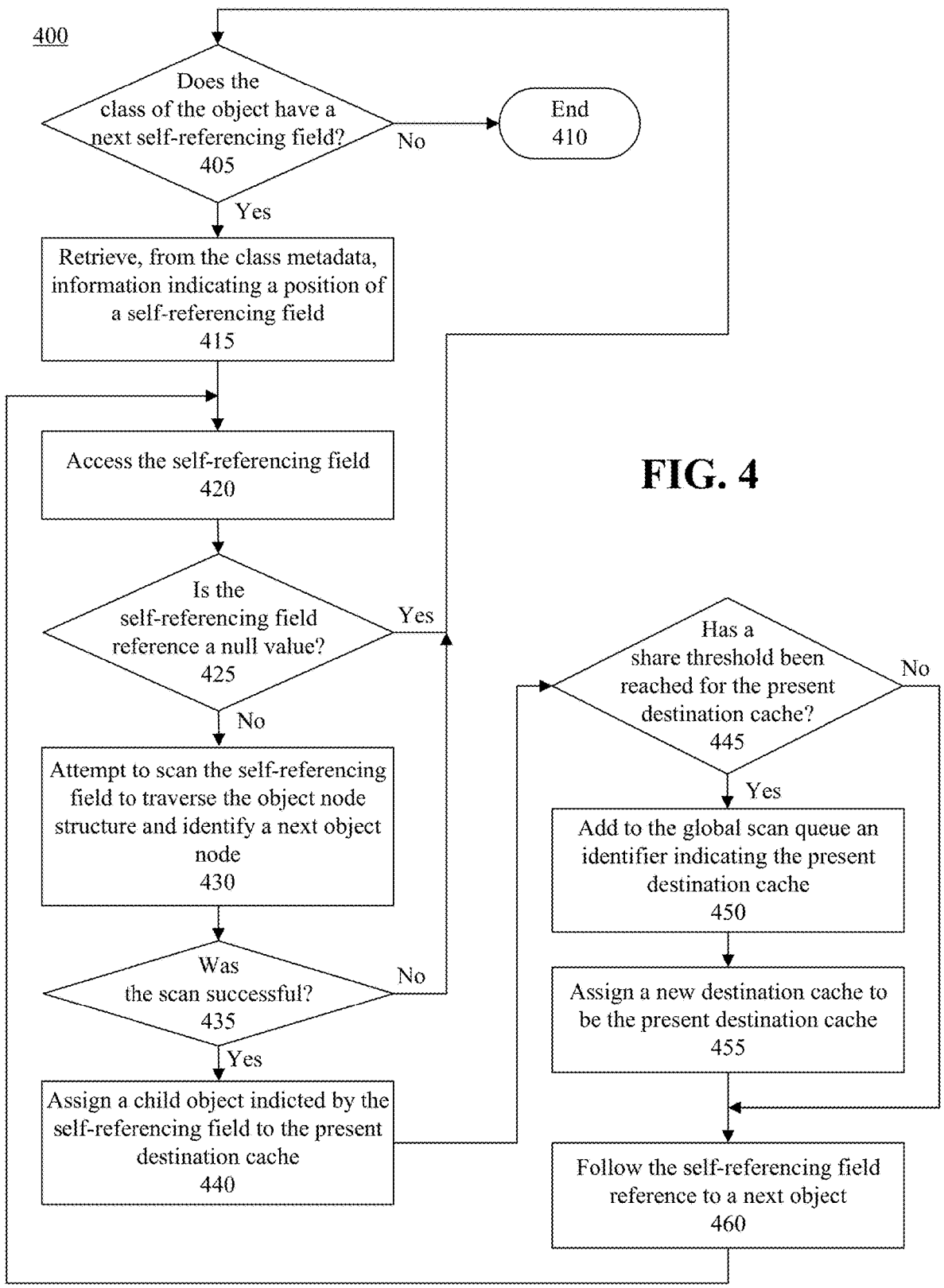
FIG. 4 is a flowchart illustrating an example of a method of traversing and scanning deep structure nodes.

Referring again to decision box 325, responsive to not determining to postpone the deep structure scan, the typical scan order of objects can be impeded, and at step 360 the garbage collector 155 can perform traversal and scan of deep structure nodes (e.g., in the object graph) that include a node representing the object 165, which is described in greater detail by the method 400 of FIG. 4. Responsive to completing step 360, at step 330 the garbage collector 155 can scan object slots occupied the object 365 and continue the process. In this regard, the typical object slot scan order is impeded until the traversal and scan of deep structure nodes is complete.

FIG. 4 is a flowchart illustrating an example of a method 400 of traversing and scanning deep structure nodes. The method 400 can be implemented by the garbage collector 155 of FIG. 1 to perform the operation described at step 360 of FIG. 3. Accordingly, the method 300 can include all or part of the method 400.

At decision box 405, the present thread 157 of the garbage collector 155 can determine whether the accessed object 165 has a next self-referencing field. In illustration, the present thread 157 can access the class metadata 175 for the class to which the object 165 belongs and determine whether any class fields of the class are indicated in the field 180 of the class metadata 175 that is configured to indicate a next self-referencing field. In illustration, the present thread 157 can determine whether an offset to the class field of the next self-referencing field is indicated in the field 180 of the class metadata 175.

Responsive to the present thread 157 determining that the class to which the object 165 belongs does not include a next self-referencing field, at step 410 the method 400 can end, and the process can proceed to step 330 of FIG. 3. Responsive to the present thread 157 determining that the class to which the object 165 belongs does include a next self-referencing field, however, at step 415 the present thread 157 can retrieve, from the class metadata, information indicating a position of the next self-referencing field, for example an offset (e.g., a number of bytes) to the self-referencing field from a memory address of a beginning of the object address in the heap 160. At step 420 the present thread 157 can access the self-referencing field using the position information.

At decision box 425 the present thread 157 can determine whether a reference of the self-referencing field is a null value. Responsive to the present thread 157 determining that the self-referencing field reference is a null value, the process can return to decision box 405 where the garbage collector can determine whether there is a next self-referencing field, and the process can continue. Responsive to the present thread 157 determining that the self-referencing field reference is not a null value, however, at step 430 the present thread 157 can attempt to scan the self-referencing field to traverse the object node structure and identify a next object node (e.g., an object that is a child of the present object) that has not already been added to the destination cache 185 or a previously generated source cache 190. For example, the present thread 157 can determine whether the self-referencing field of the object 165 points to a child object, identify the child object, if any, and determine whether the child object has already been assigned to the destination cache 185 or a previously generated source cache 190. In illustration, the child object can include a flag (e.g., a bit in a header field of the child object), that indicates whether the child object has already been assigned to a cache 185, 190. The garbage collector can access that flag to determine whether the flag has been set to indicate that the child object has been assigned to a cache 185, 190.

At decision box 435 the present thread 157 can determine whether the scan was successful. The scan is successful if the self-referencing field reference points to a child object that has not already been assigned to the present destination cache 185 or a previously generated source cache 190. Responsive to the present thread 157 determining that the scan was not successful, the process can return to decision box 405 and continue. Responsive to the present thread 157 determining that the scan was successful, however, at step 440 the present thread 157 can assign, to the present destination cache 185, the child object pointed to by the self-referencing field. For example, the present thread 157 add to the present destination cache 185 an identifier for such child object, for example a pointer to the child object or an offset from the object 165 that is the parent of the child object. Further, the garbage collector can set the flag for the child object to indicate that the child object has been assigned to a cache 185, 190. Accordingly, the method 400 can ensure that the child objects be added only to a single cache 185, 190, thereby preventing the child objects from being processed multiple times during at step 330 of FIG. 3. This serves to improve efficiency of the garbage collection process.

At decision box 445, the present thread 157 can determine whether a share threshold has been reached for the present destination cache 185. For example, the present thread 157 can determine whether at least a threshold number of object identifiers have been added to the present destination cache 185. Responsive to the present thread 157 determining that a share threshold has been reached for the present destination cache 185, at step 450 the present thread 157 can add the present destination cache to a global scan queue 195, in which case the present destination cache 185 will become a new source cache 190 for garbage collector threads 157 to process. In illustration, the present thread 157 can add to the global scan queue 195 an identifier indicating the present destination cache 185 (which then becomes a source cache 190). It should be noted that after the present destination cache 185 is added to the global scan queue 195 as a source cache 190, the present thread 157 can create a new destination cache 185, which will become the present destination cache if further objects to be added to a destination cache 185 are identified during the process performed by method 400. Further, at step 455 the present thread 157 can assign a new destination cache 185 to be the present destination cache. For example, the present thread 157 can identify an empty destination cache 185, or create a new destination cache, and assign that destination cache the new destination cache 185. The process then can proceed to step 460. Referring again to decision box 445, responsive to the present thread 157 determining that a share threshold has not been reached for the present destination cache 185, the process can proceed to step 460. At step 460 the present thread 157 can follow the self-referencing field reference to the next node of the deep structure (i.e., a child object), and the process can continue at step 420 until the method 400 ends at step 410. In this regard, at step 420, the self-referencing field that is being accessed is that of the next node of the deep structure (i.e., the child object).

Figure 5:
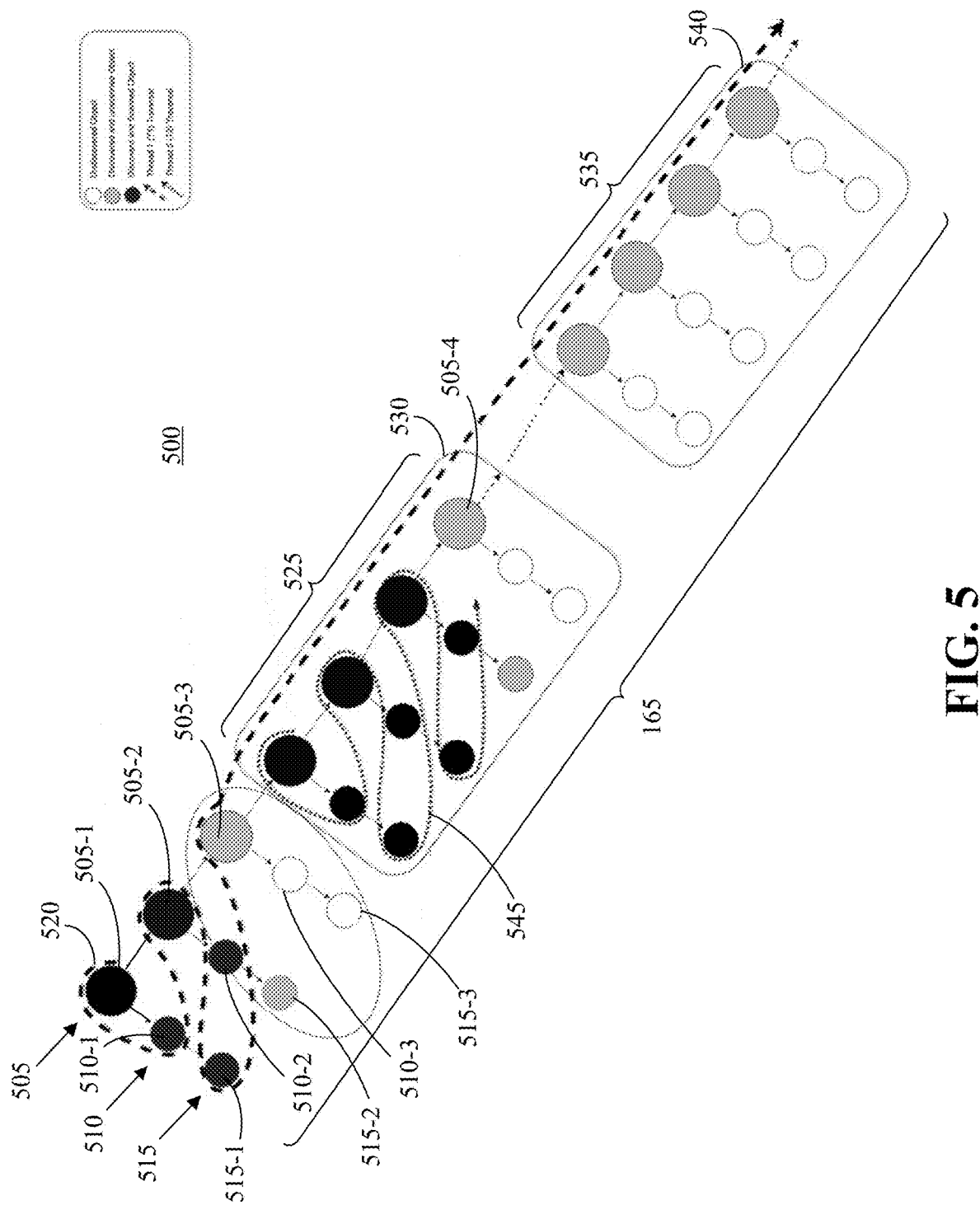
FIG. 5 depicts a portion of a node structure comprising objects stored in memory upon which garbage collection is being performed.

FIG. 5 depicts a portion of a node structure 500 (e.g., an object graph) comprising objects 165 stored in local memory 120, for example in a heap 160, upon which garbage collection is being performed by the garbage collector 155 in accordance with the methods 300, 400 of FIGS. 3 and 4.

The objects 165 can include objects 505, each of which includes one or more self-referencing fields. The objects 165 also can include objects 510, 515 that do not include self-referencing fields. The objects 510, 515 can be, for example, child objects. For example, the child object 510-1 can be a child of the object 505-1, and the child object 515-1 can be a child object of the object 510-1.

During garbage collection, a thread 157 (e.g., a first thread) of the garbage collector 155 can traverse the objects 505-515 following a path 520. In accordance with the method 300, the first thread 157 can scan object slots in memory occupied by the objects 505-1, 510-1, 505-2, 515-1, 510-2 until the garbage collector 155 (e.g., the first thread) reaches object 505-3 and, at decision box 325 of FIG. 3, determines to impede the typical object slot scan order by not postponing a deep node structure scan. For example, the garbage collector 155 can begin the scan in a breadth first scan order (BFSO) and scan the objects 505-1, 510-1, 505-2, 515-1, 510-2 using BFSO until the garbage collector 155 determines to proceed to step 360 of FIG. 3, for example as previously described.

In accordance with the method 400 of FIG. 4, the garbage collector 155 (e.g., the first thread 157) can discover objects 525 that are live, assign those objects 525 to a first destination cache 530, and push that cache 530 to the global scan queue 195 as a source cache 190. Further, the first thread 157 can assign objects 535 that are live to a second destination cache 540, push that cache 540 to the global scan queue 195 as a source cache 190, and so on. At some point, for example after assigning objects 525, 535, etc. to the caches 530, 540, etc., the first thread 157 of the garbage collector 155 can return to the objects 515-2, 505-3, 510-3, 515-3 and scan the memory slots occupied by those objects, for example using a breadth first scan order. In other arrangements, one or more other threads 157 can access the objects 515-2, 505-3, 510-3, 515-3 and scan the memory slots occupied by those objects.

Other threads 157 of the garbage collector 155 can access the source caches 530, 540 from the global scan queue 195, and scan the memory slots occupied by the objects 525, 535. In illustration, another thread 157 (e.g., a second thread 157) of the garbage collector 155 (e.g., a second thread) can access the source cache 530 and begin scanning the memory slots occupied by the objects 525 in accordance with the method 300 of FIG. 3 by traversing the objects 525 using a breadth first scan order, as indicated by the path 545. If the other thread 157 determines at decision box 325 to impede the typical object slot scanning by not postponing the deep structure scan, for example after reaching the object 505-4, the other thread 157 can begin adding deep structure objects 165 to a destination cache 185, and push that cache to the global scan queue 195 as a source cache 190, for example as described in step 450 of method 400 of FIG. 4. As previously described, the source cache 190 can be made available for processing by other threads 157 of the garbage collector 155. Responsive to completing step 360 of FIG. 3, at step 330 the garbage collector 155 can scan object slots occupied the object and continue.

Further, yet another thread 157 (e.g., a third thread 157) of the garbage collector 155 (e.g., a third thread) can access the source cache 540 and scan the memory slots occupied by the objects 535 by traversing the objects 535 using a breadth first scan order, and so on. In this regard, that thread can implement the method 300 of FIG. 3, as previously described.

At some point all live objects 165 contained in the node structure 500 will have been identified as being live. The garbage collector can apply techniques known in the art to reclaim from the local memory 120 memory space occupied by objects that are not live. For example, as noted, the garbage collector 155 can initiate a copy collector to move the live object 365 to another area of the heap 160, for example a survivor area of the heap 160, and the garbage collector can reclaim memory areas of the heap 160 outside of the survivor area. In another example, the garbage collector 155 can initiate a simple mark-sweep collector to traverse the heap/object graph and mark all found objects 165 as live. The simple mark-sweep collector then can sweep and compact all of the marked objects to an area of the heap 160 (e.g., the survivor area), and reclaim the rest of the heap 160 as available memory. Still, the garbage collector 155 can reclaim areas of the heap 160 not occupied by live objects in any other suitable manner, and the present arrangements are not limited in this regard.

The foregoing description is just an example of embodiments of the invention, and variations and substitutions.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   during garbage collection object graph traversal, using a first thread of a garbage collector executed by a processor, determining fields, in class metadata assigned to objects contained in a local memory, that are self-referencing fields;
   for a plurality of the objects for which the self-referencing fields are determined, recursively:
     determining, by the first thread of the garbage collector, whether the object has at least one child object, indicated by a self-referencing field of the object, that has not been assigned to a first destination cache or a previously generated source cache; and
     responsive to determining that the object has at least one child object, indicated by the self-referencing field, that has not been assigned to the first destination cache or the previously generated source cache, assigning, by the first thread of the garbage collector, the at least one child object to the first destination cache, the assigning the at least one child object to the first destination cache indicating that the at least one child object is a live object;
   adding, by the first thread of the garbage collector, the first destination cache to a global scan queue as a first source cache;
   using at least a second thread of garbage collector, accessing the first source cache using the global scan queue, and initiating, by the second thread of the garbage collector, object scanning on objects indicated in the first source cache; and
   reclaiming, from the local memory, memory locations where live objects are not located.

2. The method of claim 1, further comprising:
   impeding a scan of object slots in the local memory occupied by at least one of the plurality of the objects until after the at least one child object is assigned to the first destination cache.

3. The method of claim 1, further comprising:
   impeding a scan of object slots in the local memory occupied by at least one of the plurality of the objects until after each self-referencing field of the one of the plurality of the objects has been determined to reference a null value or has been scanned to identify a next object indicated by the self-referencing field.

4. The method of claim 1, wherein initiating, by the second thread of the garbage collector, the object scanning on objects indicated in the first source cache comprises:
   for a plurality of the objects identified in the first source cache for which the self-referencing fields are determined, recursively:

determining, by the second thread of the garbage collector, whether the object has at least one child object, indicated by a self-referencing field, that has not been assigned to a second destination cache, the first source cache or the previously generated source cache; and responsive to determining that the object has at least one child object, indicated by the self-referencing field, that has not been assigned to the second destination cache, the first source cache or the previously generated source cache, assigning, by the second thread of the garbage collector, the at least one child object to the second destination cache, the assigning the at least one child object to the second destination cache indicating that the at least one child object is a live object.

5. The method of claim 4, wherein initiating, by the second thread of the garbage collector, the object scanning on objects indicated in the first source cache further comprises:

adding, by the second thread of the garbage collector, the second destination cache to the global scan queue as a second source cache.

6. The method of claim 1, further comprising:

during building of a class description for a class to which the object belongs, determining whether a field of the class is a self-referencing field; and responsive to determining that the field of the class is a self-referencing field, adding to the class metadata for the class an indication that the self-referencing field is a priority field;

wherein the determining, by the first thread of the garbage collector, whether the object has at least one child object comprises identifying in the class metadata for the class to which the object belongs the indication that the self-referencing field is the priority field.

7. The method of claim 6, wherein the indicating the self-referencing field is a priority field in the class metadata for the class comprises adding to a field of the class metadata an offset to the self-referencing field.

* * * * *